UNITED STATES PATENT OFFICE.

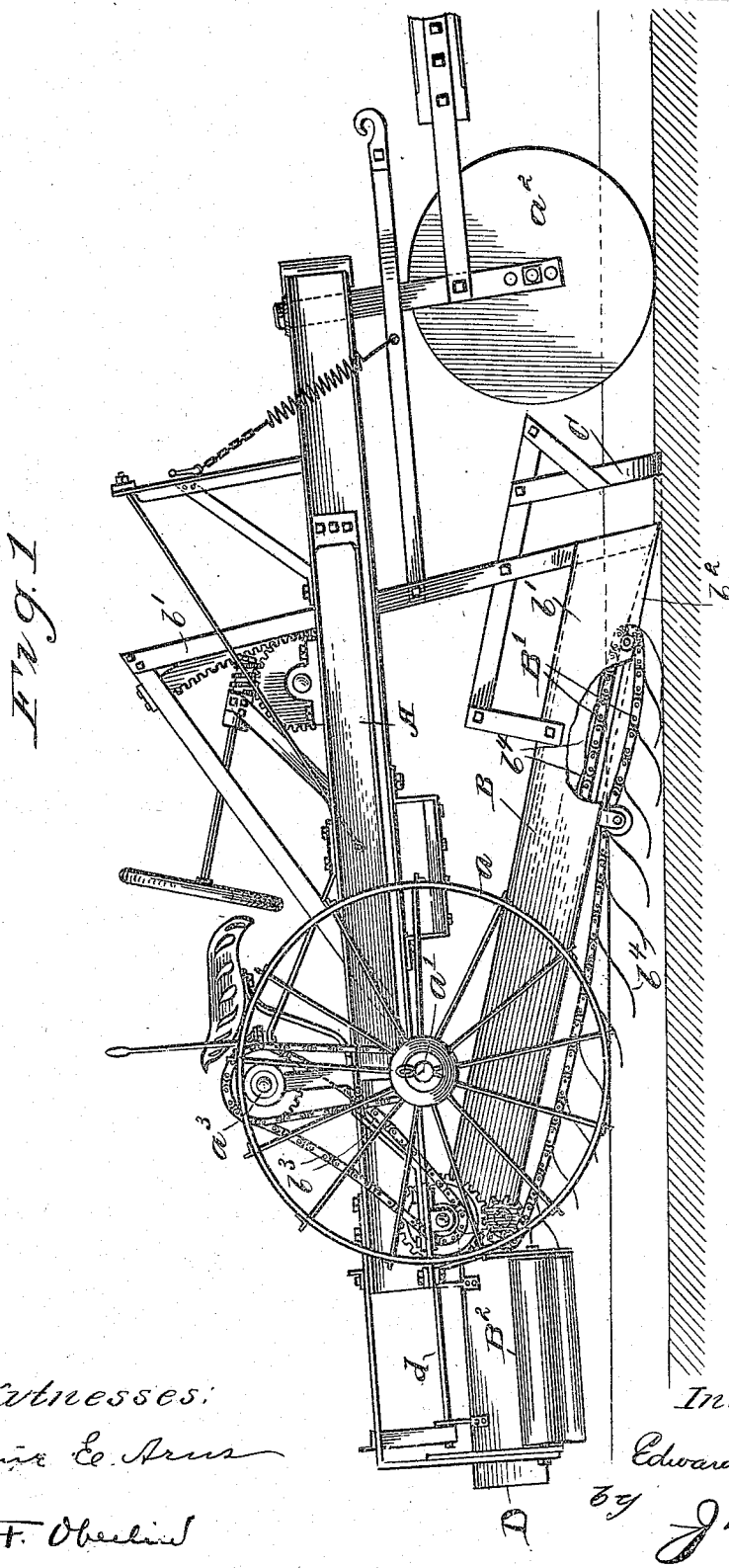

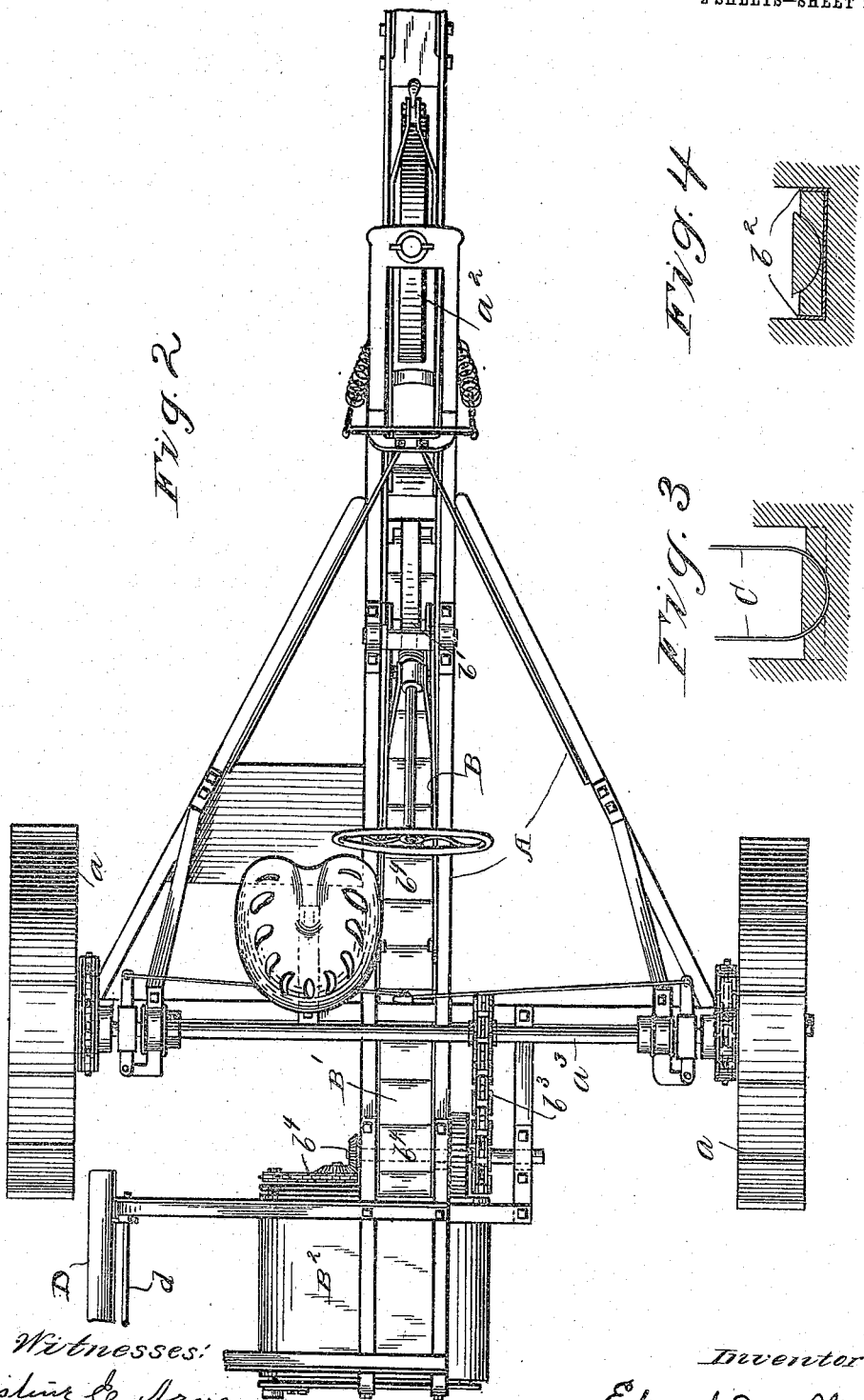

EDWARD JESCHKE, OF BELLEVUE, OHIO, ASSIGNOR TO THE JESCHKE MANUFACTURING COMPANY, OF BELLEVUE, OHIO, A CORPORATION OF OHIO.

MACHINE FOR DIGGING DITCHES.

939,598.          Specification of Letters Patent.          Patented Nov. 9, 1909.

Application filed December 24, 1908. Serial No. 469,132.

*To all whom it may concern:*

Be it known that I, EDWARD JESCHKE, a citizen of the United States, and a resident of Bellevue, county of Huron, and State of Ohio, have invented a new and useful Improvement in Machines for Digging Ditches, of which the following is a specification, the principle of the invention being herein explained and the best mode in which I have contemplated applying that principle, so as to distinguish it from other inventions.

The general type of ditching machine or excavator to which the present invention appertains, is that wherein a shovel is employed to detach the earth, conveyer means being provided to receive the material from said shovel and discharge the same from the machine. Such shovel must of necessity be as wide as the ditch which it is desired to dig, and preferably has an approximately straight transverse cutting edge, laterally bounded by cutting edges at right angles thereto; in other words the shovel is of rectangular or box-like cross-section. Considerable difficulty has been experienced in operating this type of digger in any but very loose soils, by reason of the jamming of the earth between the sides of the shovel, for as will be obvious the layer of earth cut out by the shovel must be compressed into a smaller area as it passes upwardly across the shovel onto the conveyer.

The object of the present invention, is the provision of means for overcoming this difficulty, as also to provide an improved construction of conveyer for thus removing the material from the shovel.

To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a side elevational view of a machine for digging ditches wherein have been incorporated my several improvements; Fig. 2 is a plan view of the same; while Figs. 3 and 4 are sectional views across the ditch being dug, illustrating the mode of operation of my improved digger.

The general structural features of the machine will require to be only briefly noted.

The running gear comprises a triangular frame A that is desirably very rigidly constructed. Such frame is disposed with the apex to the front having regard to the direction of movement of the machine when in use, the main or driving wheels $a$ being mounted at opposite ends of the frame base, which constitutes an axle $a'$. Pivotally mounted upon the frame to the rear of such axle is the conveyer frame or trough B, the lower end of which extends thence forwardly under the carriage frame, from which its forward end $b'$ is suspended at an adjustable height by a rack $b$ and pinion meshing therewith. Such forward end of the frame, it should be remarked, is supported upon a wheel $a^2$, that is smaller than drive wheels $a$, and that is designed to run in the ditch or trench being dug. In this way the forward end of the conveyer trough B and the shovel $b^2$ borne thereby will always be maintained at a pre-determined depth below the surface upon which such forward wheel or roller runs, depending upon the adjustment of the suspending means. The rear or driving wheels are spaced sufficiently far apart to lie not only without the ditch, but also without the earth discharged from the machine, such earth being thrown to one side or the other of the ditch by a conveyer $B^2$ arranged transversely at the rear end of the main conveyer $B'$, whereby the material is elevated from the shovel. Suitable gearing $b^3$, $b^4$ connects such conveyers with a secondary shaft $a^3$ located above and driven from axle $a'$.

The foregoing construction, it will be understood, is more or less characteristic of the general type of machine to which this invention belongs.

Of the novel features of construction, attention will first be called to a cutter C which I dispose just in front of the aforesaid shovel, said cutter being rigidly mounted in the conveyer frame B, so as to bear a substantially constant relation to said shovel. In its preferred form said cutter, as illustrated, comprises simply a rigid band of metal bent into a general U-shape, so as to sever a central portion from the layer of material taken from the ditch by the shovel $b^2$. By reason of the form of said cutter, such central portion will obviously be severed from the remaining portions of the layer in question at an angle with respect to a horizontal plane, (see Fig. 3). As a result, such portions will readily slide, one over the other, so as to permit the layer as a whole to be laterally compressed, and taken up by the shovel (see Fig. 4), without any of the difficulties referred to as attending the present form of construction. I am aware of course, that colters and shares have been employed in advance of the shovels in ditching machines to loosen up the earth, but it will be evident that by the particular form of cutter which I have devised, a unique and much more important result than simply the loosening of the soil is attained. In addition to this feature of cutter construction reference has been made to the construction of the conveyer B', which passes along the conveyer frame or trough B. Such conveyer comprising two or more sprocket chains as usual that run over suitable sprockets or rollers at the ends of the conveyer trough, is distinguished by the use, in place of flights of the prevailing type, of flexible leaves or flaps $b^4$ that are adapted to hang loosely as they pass along the underside of the conveyer and lie flat and overlap the one on the upper side thereof, so as to provide in effect a continuous carrier surface upon which the earth dislodged and taken up by the joint action of cutter C and shovel $b^2$ is borne in a continuous stream. By reason, however, of the opening movement of the flaps when on the under side of the trough, the accumulation of earth, or trash, between the two runs of the conveyer is prevented as well as the consequent jamming of the rolls or sprockets. This feature hence contributes in no small measure to the successful operation of the machine.

It will be understood that, as to the cutter, the recurved U-shape presented as preferable, is not the only one that will effect the separation of the layer of earth in the manner described, but that one or more separate blades suitably disposed and properly curved might produce the desired result. I should also, by way of conclusion, call attention to the fender D, that is hung in front of the discharge end of transverse conveyer $B^2$. This fender is adjustably pivoted on a supporting rod $d$ and serves to deflect downwardly the stream of earth from the conveyer, thus guarding the drive wheel $a$ and leaving the track of the latter clear, as is quite essential if such wheel is to effectively operate.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination of a running gear, a shovel, means adapted to receive material from said shovel and discharge the same from the machine, and a cutter in advance of said shovel, said cutter being adapted to sever the layer of material taken by said shovel angularly with respect to a horizontal plane, whereby such layer may be laterally compressed, substantially as described.

2. In a machine of the character described, the combination of a running gear, a shovel, means adapted to receive material from said shovel and discharge the same from the machine, and a cutter in advance of said shovel, said cutter being arranged and constructed to sever a central portion from the layer of material being taken by said shovel.

3. In a machine of the character described, the combination of a running gear, a shovel, means adapted to receive material from said shovel and discharge the same from the machine, and a cutter in advance of said shovel, said cutter being arranged and constructed to sever a central portion from the layer of material being taken by said shovel, the cut between such central and the remaining portions being angular with respect to a horizontal plane.

4. In a machine of the character described, the combination of a running gear, a shovel, means adapted to receive material from said shovel and discharge the same from the machine, and a cutter in advance of said shovel, said cutter being of general U-shape and so disposed as to sever a central portion from the layer of material taken by said shovel.

5. In a machine of the character described, the combination of a running gear, a shovel, means arranged to discharge earth laterally from the machine, an endless conveyer adapted to receive material from said shovel and elevate the same to said discharging means, said conveyer comprising a series of levers adapted to hang loosely on the under side of the conveyer and to lie flat on the upper side thereof, and a cutter in advance of said shovel, said cutter being adapted to sever the layer of material taken by said shovel angularly with respect to a horizontal plane, whereby such layer may be laterally compressed, substantially as described.

6. In a machine of the character described, the combination of a running gear, a shovel, means arranged to discharge earth laterally from the machine, an endless conveyer adapted to receive material from said shovel and elevate the same to said discharging means, said conveyer comprising a series of flexible leaves or flaps adapted to hang loosely on the under side of the conveyer and to lie flat and overlap the one on the upper side thereof, and a cutter in advance of said shovel, said cutter being of general U-shape and so disposed as to sever a central portion from the layer of material taken by said shovel.

7. In a machine of the character described, the combination of a running gear, a shovel, means arranged to discharge earth laterally from the machine, an endless conveyer adapted to receive material from said shovel and elevate the same to said discharging means, and a fender located in front of the discharge end of said means adapted to direct the material therefrom downwardly.

Signed by me this 19th day of December, 1908.

EDWARD JESCHKE.

Attested by—
J. P. VICKERY,
R. R. PARKHURST.